Dec. 2, 1930.  Z. P. CANDEE  1,783,403
CONNECTION
Filed Jan. 24, 1929

INVENTOR
Zenas P. Candee
BY George E. Hall
ATTORNEY

Patented Dec. 2, 1930

1,783,403

UNITED STATES PATENT OFFICE

ZENAS P. CANDEE, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT

CONNECTION

Application filed January 24, 1929. Serial No. 334,844.

This invention relates to a new and improved connection, more particularly of the ball type used in a press or like mechanism.

It is the object of this invention, among other things, to provide a connection of this character that will have the maximum strength, will withstand without impairment the strain of drawing the gate back, stripping the punches from the metal, etc., and will not be subject to lateral strains.

To these and other ends, my invention consists in the connection, having certain details of construction and combinations of parts, as will be hereinafter described and more particularly pointed out in the claims.

The improvements in details and arrangements of parts will be apparent from an inspection of the accompanying drawings in conjunction with the description hereinafter contained and wherein a preferred embodiment of the invention is disclosed for the purpose of imparting an understanding thereof.

In the drawings, wherein like characters of reference indicate like parts in the several figures.

Figure 1:
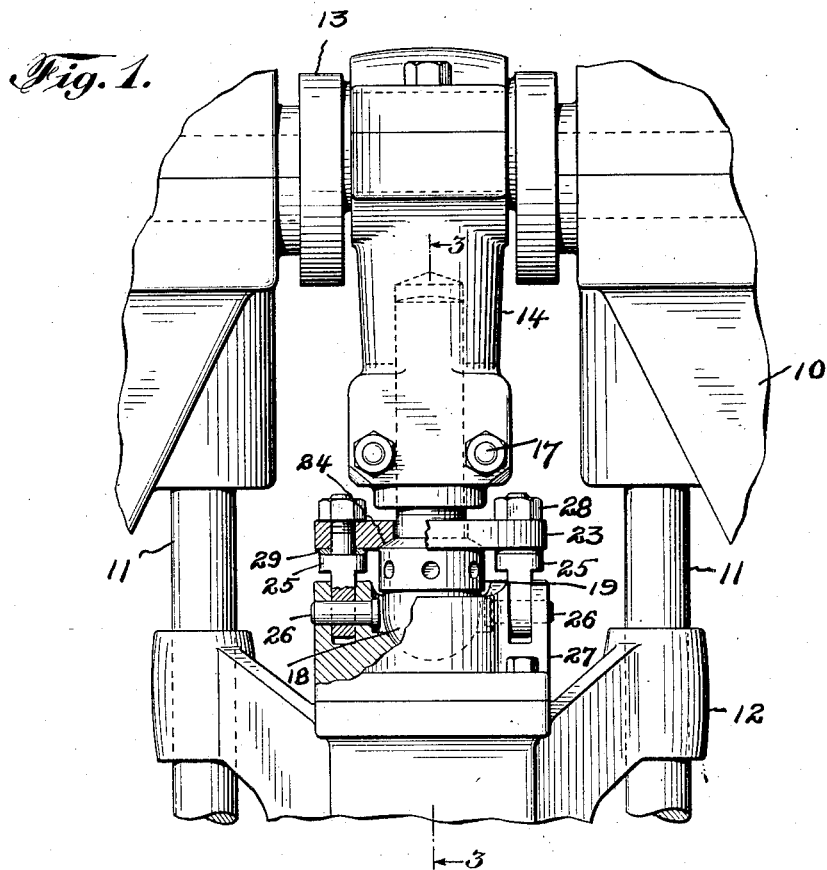
Figure 1 is a view of my improved connection, partly in section with some adjacent parts.
Figures 2, 3:
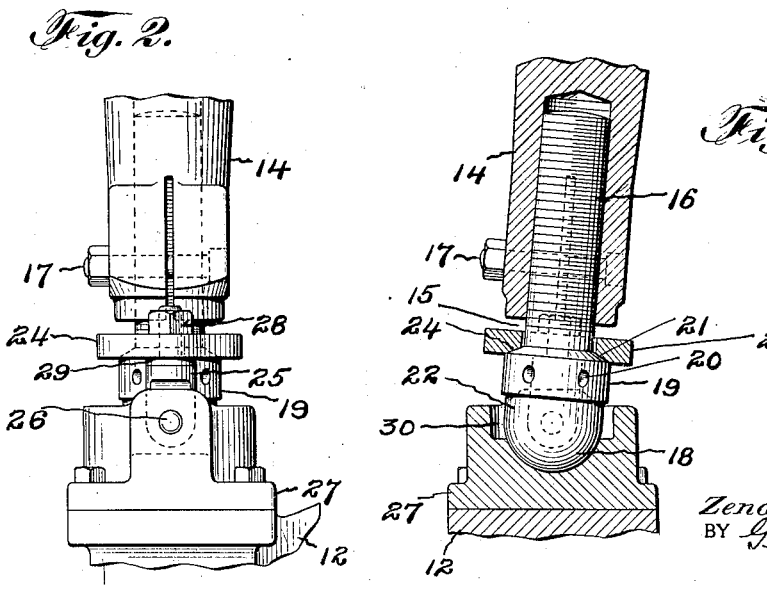
Figure 2 is another view thereof.
Figure 3 is a sectional view of some of the parts, taken generally upon line 3—3 of Figure 1.

Heretofore it has been the practice to provide a ball connection for a press or the like, wherein a ball is formed on the end of a cylindrical shank and at the point of juncture thereof the shank is necked down to a relatively small diameter.

This produces a very weak point in the connection. Said ball portion is associated with the gate or other part by means of a nut or the like, which forms generally a portion of the bearing for the ball which takes all of the strain required to withdraw the gate and the punches or dies associated therewith out of the metal operated on. Such a ball connection must be machined and fitted with great accuracy and nicety, otherwise it will not operate smoothly but will bind and cramp, creating unnecessary friction and applying lateral and other strains and wear at several places not designed to receive such strains and wear. In order to assemble the parts the area of contact between the nut and ball is necessarily limited.

With my improved connection there is no necking in of the ball at its juncture point with the shank. On the contrary its diameter is materially increased. The strain upon the parts during the withdrawal of the gate and stripping the punches from the metal, etc., is not on the ball, but at a point distant therefrom and upon a surface having a very much larger radius than the ball itself. The parts are so designed and associated as to require only an approximate machining thereof, as they will adjust themselves in their assembly, and lateral strains are entirely eliminated.

In the embodiment of my invention as herein disclosed, 10 indicates a portion of a press or the like; 11 guideways associated therewith, upon which a gate 12 is movably mounted; 13 is the crank shaft; and 14 the pitman associated therewith and deriving power therefrom.

The form of press shown is provided with guideways but any one of many other means for supporting and guiding the gate may be used equally as well.

The connection screw 15 is provided with a shank 16 that is threaded into the pitman 14 and in its adjusted positions held clamped therein by means of the bolts 17, in a well known manner.

The end of the connection screw 15 is rounded at 18 and between the shank 16 and such end is an enlarged portion 19 having apertures 20 therethrough, whereby a pin may be inserted for the purpose of rotating the connection screw 15 to bring it to its several adjusted positions.

The portion 22 of the connection screw 15 between the rounded end 18 and the enlarged portion 19 is substantially the same diameter as the largest diameter of the rounded end 18.

Encircling the shank 16 is a clamp plate 23 having thereon a bearing face 24 of substantially the same shape and radius as that of the face 21, which two faces are in engagement with each other.

Upon each side of the connection screw 15 is a pivot stud 25, which is journaled at one end on a pin 26 in the connection block 27, which is fixed to the gate 12 and has a rounded depression therein that forms a seat for the rounded end 18.

The shank of each of the studs 25 projects through an opening in the clamp plate 23 and by means of the nut 28 and collar 29 is rigidly secured thereto. I find it desirable at times to fix the stud 25 on the pin 26, in which case the latter will rotate in the connection block.

With the head of the pin 26 upon the inner side of the connection block the latter cannot become dislodged.

An enlarged recess 30 in the connection block 27 above the bearing of the rounded end 18 provides for free movement of the connection screw 15 therein.

As the gate 12 moves toward the bed of the machine and the tools perform their function, the pressure is taken by the rigid structure, comprising the pitman 14, connection screw 15, connection block 27, and gate 12.

The clamp plate 23 and associated parts follow the rocking motion of the connection screw between its extreme positions caused by rotation of the crank shaft 13, during which time the pivot studs rock upon the pins 26.

During the return movement of the gate all of the pressure and strain is taken by the clamp plate 23, gate 12, studs 25, pin 26, connection block 27, and associated parts. Thus, pressure of withdrawing the gate, stripping the punches out of the metal, etc., is distributed over a very much larger area than is the pressure during the opposite movement of the gate.

As the bearing between the connection screw 15 and clamp plate 23 is curved upon a radius having a center common to the rounded end 18, the clamp automatically adjusts itself to the connection screw 15, with only approximate machining. The connection screw 15, connection block 27 and associated parts combine to form a unitary structure and therefore these may all be assembled as a unit and as such the connection block 27 secured to the gate 12.

Applicant desires it to be understood that he does not limit himself to the exact construction herein shown and described, but claims all that falls fairly within the scope and spirit of the appended claims.

Having described my invention what I claim as new and desire to secure by Letters Patent, is:

1. A power transmitting device, comprising in combination an element having a rounded socket therein; a recess opening into the socket and of greater diameter; a connection member having a rounded end to operate in said socket; means for maintaining the rounded end of the connection member in engagement with said socket, comprising in part a clamp plate having engagement with the connection member; one or more studs fixed in the clamp plate; a pin in said element for each stud forming a hinged connection for the studs and having a head thereon that is within said enlarged recess and held against disengagement from the said element by said connection member.

2. In a power transmitting device, an element having a rounded socket, a connecting member having a rounded end movably engaged in said socket, and having a rounded shoulder spaced from said rounded end, means to hold the rounded end in said socket, engaged about said member and having a correspondingly rounded seat engaged with said rounded shoulder whereby to allow the member and holding means to automatically adjust themselves with varying angular relation of the holding means relative to the longitudinal axis of the member, and means to pivotally connect the holding means to the element.

3. In a power transmitting device, an element having a rounded socket, a connecting member having a rounded end movably engaged in said socket, and having a shoulder spaced from said rounded end, means to hold the rounded end in said socket, engaged about said member and having a corresponding seat engaged with said shoulder, and means to pivotally connect the holding means to the element including studs connected to the holding means and fasteners having heads which extend through the studs and element and have their heads confronting said rounded end and disposed adjacent thereto whereby said rounded end holds the fasteners against removal.

In testimony whereof, I have hereunto affixed my signature.

ZENAS P. CANDEE.